(12) United States Patent
Song et al.

(10) Patent No.: US 9,130,749 B1
(45) Date of Patent: Sep. 8, 2015

(54) METHOD AND APPARATUS FOR DECODING A DATA PACKET USING SCALABLE SOFT-BIT RETRANSMISSION COMBINING

(71) Applicant: Marvell International Ltd., Hamilton (BM)

(72) Inventors: Leilei Song, Sunnyvale, CA (US); Hui-Ling Lou, Sunnyvale, CA (US); Zheng Zhang, San Jose, CA (US)

(73) Assignee: Marvell Internatonal Ltd., Hamilton (BM)

( * ) Notice: Subject to any disclaimer, the term of this patent is extended or adjusted under 35 U.S.C. 154(b) by 82 days.

(21) Appl. No.: 14/019,006

(22) Filed: Sep. 5, 2013

Related U.S. Application Data

(60) Provisional application No. 61/700,215, filed on Sep. 12, 2012.

(51) Int. Cl.
*H04L 1/18* (2006.01)
*H04L 1/08* (2006.01)
*H04L 1/00* (2006.01)

(52) U.S. Cl.
CPC ............. *H04L 1/1812* (2013.01); *H04L 1/08* (2013.01); *H04L 1/0045* (2013.01)

(58) Field of Classification Search
CPC ............. H03M 13/6306; H04L 1/1845; H04L 1/1819; H04L 1/004; H04L 1/005; H04L 1/0045; H04L 1/1812; H04L 1/1809
USPC .......................................................... 714/748
See application file for complete search history.

(56) References Cited

U.S. PATENT DOCUMENTS

| | | | |
|---|---|---|---|
| 8,583,975 B2 * | 11/2013 | Kim et al. ...................... | 714/748 |
| 2003/0014709 A1 * | 1/2003 | Miyoshi et al. ................ | 714/758 |
| 2006/0064625 A1 * | 3/2006 | Klein et al. .................... | 714/776 |
| 2009/0024896 A1 * | 1/2009 | Tseng ............................ | 714/751 |
| 2009/0135965 A1 * | 5/2009 | Shen et al. ..................... | 375/341 |
| 2009/0154392 A1 * | 6/2009 | Park et al. ..................... | 370/328 |
| 2009/0249155 A1 * | 10/2009 | Mayrench et al. ............. | 714/748 |
| 2010/0329368 A1 * | 12/2010 | Shimezawa et al. ........... | 375/259 |
| 2011/0041023 A1 * | 2/2011 | Shimezawa et al. ........... | 714/748 |
| 2011/0044409 A1 * | 2/2011 | Yoshimoto et al. ............ | 375/340 |
| 2012/0314655 A1 * | 12/2012 | Xue et al. ...................... | 370/328 |
| 2013/0322334 A1 * | 12/2013 | Wasily, Nabil Yousef .... | 370/328 |

* cited by examiner

*Primary Examiner* — Cynthia Britt

(57) ABSTRACT

Methods and systems for decoding a data packet using soft-bit retransmission combining are provided herein. A first transmission of the data packet is received and corresponding soft information is generated. The soft information is represented by a first set of bits and a subset of those bits is stored. Subsequently, a second transmission of the data packet is received and corresponding soft information is generated. The soft information corresponding to the second transmission is represented by a second set of bits and combined with the stored subset of soft-bits corresponding to the first transmission to produce a third set of bits. At least a portion of the data packet is decoded based on the third set of bits.

19 Claims, 4 Drawing Sheets

METHOD AND APPARATUS FOR DECODING A DATA PACKET USING SCALABLE SOFT-BIT RETRANSMISSION COMBINING

CROSS-REFERENCE TO RELATED APPLICATIONS

This patent document claims the benefit of, and priority to, U.S. Provisional Application No. 61/700,215, filed Sep. 12, 2012, the disclosure of which is hereby incorporated by reference herein in its entirety.

FIELD OF USE

This disclosure relates to retransmission techniques, such as hybrid automatic transmission request (HARQ) techniques, for enabling reliable communications between a transmitter and receiver in a communications system.

BACKGROUND OF THE DISCLOSURE

To ensure the reliability of transmitted information in wireless communication systems, error-detection and error-correction techniques are often employed. One such technique is known as hybrid automatic transmission request (HARQ), which integrates both forward error correction (FEC) coding and an automatic transmission request (ARQ) scheme for error-control. Forward error correction is a coding technique that provides error-correction capability by way of redundancy. Automatic transmission request is a method for controlling errors by retransmitting information. Hybrid ARQ (HARQ) may be implemented in various ways, one of which is based on a stop-and-wait ARQ protocol, in which a transmitter provides retransmissions in response to a negative acknowledgment (NACK) generated by the receiver. HARQ uses each transmission advantageously by performing retransmission combining using each transmitted packet, which are stored at the receiver.

HARQ often requires a large buffer at the receiver side to store soft information (such as log-likelihood ratios, or LLRs) generated from previous transmissions. The soft information is typically stored in its entirety in order to achieve optimal retransmission combining performance. Specifically, the same number of soft-bits that are used for FEC are also generally stored in memory for HARQ combining purposes, regardless of whether the soft information corresponds to the initial transmission or a retransmission. Accordingly, designers are faced with the undesirable choice of storing a smaller number of soft-bits per symbol, which results in a performance loss but requires a smaller buffer, or using a larger number of soft-bits per symbol, which results in a performance gain but requires a large external memory and/or an increase in memory bandwidth requirements. Neither of these design choices is particularly attractive.

SUMMARY OF THE DISCLOSURE

Methods and systems for decoding a data packet using soft-bit retransmission combining are provided herein. In some implementations, a first transmission of the data packet is received and corresponding soft information is generated, e.g., by a downlink receiver. The soft information is represented by a first set of bits ($N_1$ soft-bits per symbol) and a subset of those bits ($N_2$ soft-bits per symbol) is stored, e.g., in a memory or buffer. Subsequently, a second transmission of the data packet is received and corresponding soft information is generated, e.g., by the downlink receiver. The soft information corresponding to the second transmission is represented by a second set of bits ($N_1$ soft-bits per symbol) and is combined with the stored subset of soft-bits corresponding to the first transmission, e.g., by a combining circuit, to produce a third set of bits ($N_3$ bits per symbol). At least a portion of the data packet is decoded, e.g., by a decoder, based on the third set of bits.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Disclosed herein are HARQ combining techniques that require storing only a subset of the soft-bits generated for each transmission of a data packet. The disclosed techniques may reduce memory access and storage requirements with minimal impact to performance. Specifically, by increasing the number of soft-bits generated for each symbol of a transmitted data packet, receiver performance is enhanced, while storing a subset of those soft-bits reduces the amount of memory necessary to store the bits. Moreover, different scaling factors may be applied to the soft-bits generated for the various transmissions to improve performance. Each of these features is described more fully below along with other techniques and implementations.

Figure 1:
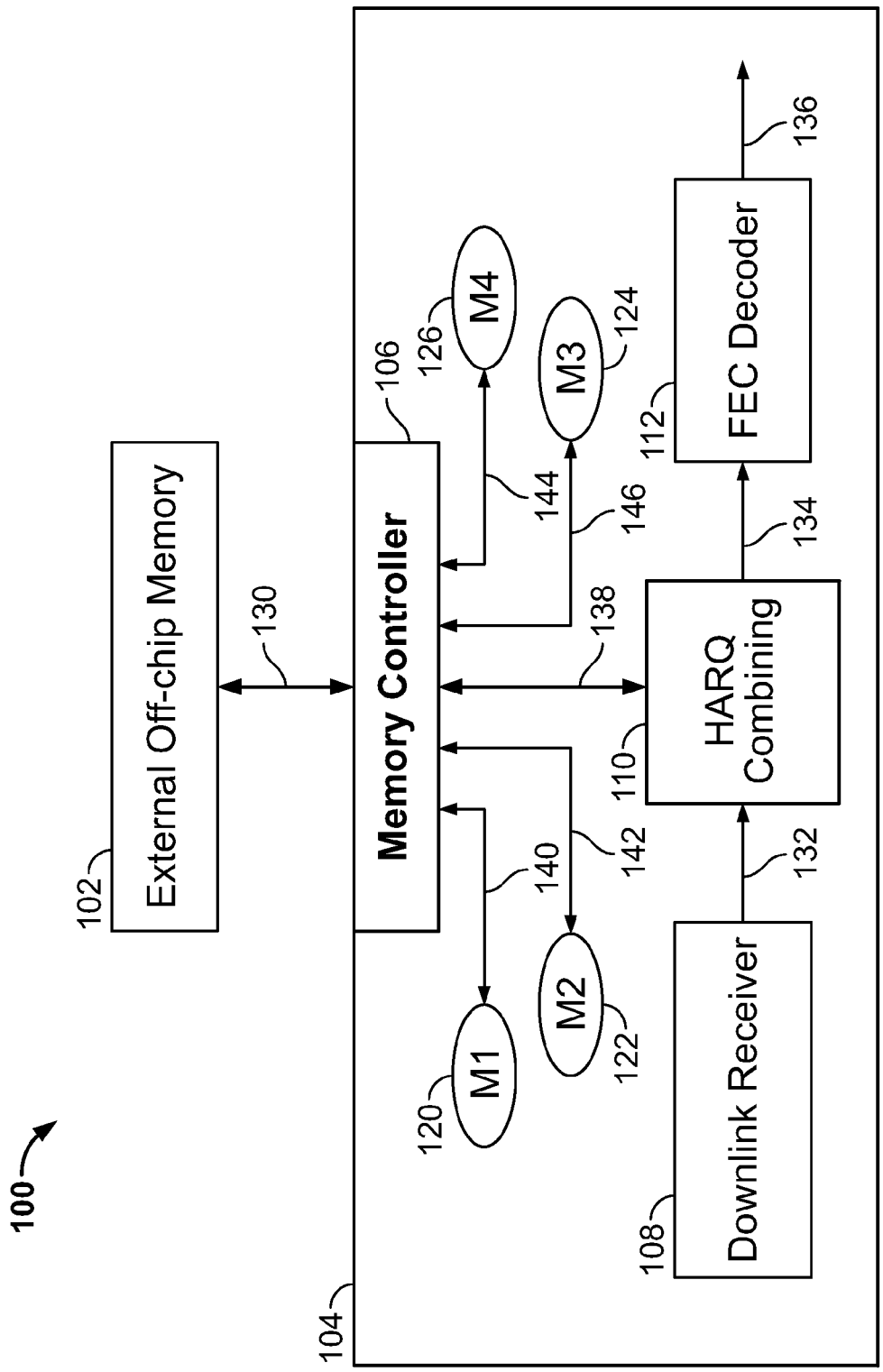
FIG. 1 depicts an exemplary receiver that includes a HARQ combining unit in accordance with some implementations.

FIG. 1 depicts an exemplary receiver 100 that includes a HARQ combining unit in accordance with some implementations. Specifically, receiver 100 includes memory 102 and integrated circuit 104. In some implementations, memory 102 is external off-chip memory, as shown. In other implementations, however, memory 102 is included within integrated circuit 104. It should be understood that the techniques described herein apply equally to implementations having on-chip memory, implementations having off-chip memory, and implementations having both on-chip and off-chip memory.

Integrated circuit 104 includes memory controller 106, downlink receiver 108, HARQ combining unit 110, and FEC decoder 136. In some implementations, integrated circuit 104 also includes memory requesting units 120, 122, 124 and 126. Memory controller 106 interfaces with memory 102 and manages memory read and/or write requests by other circuits. Although depicted as part of integrated circuit 104, memory controller 106 may be implemented on its own chip or as part of another chip. Memory controller 106 communicates with memory 102 via transmission path 130 and HARQ combining unit 110 via transmission path 138. In some implementations, memory controller 106 also communicates with memory requesting units 120, 122, 124 and 126 via transmission lines 140, 142, 144, and 146, respectively.

Downlink receiver unit 108 receives transmitted signals (e.g., transmitted data packets) and generates soft information for each received symbol. The soft information may be in the form of log-likelihood ratios (LLRs) and represented by a set of bits (or "soft-bits"). These soft-bits are provided, via transmission path 132, to HARQ combining unit 110 for combination with soft-bits stored from previous transmissions of the same data packet. For the first transmission, no prior soft-bits are available and the HARQ combining unit 110 may provide the soft-bits directly to FEC decoder 112. For each subsequent retransmission, on the other hand, HARQ combining unit 110 combines the soft-bits from downlink receiver unit 108 with stored soft-bits produced from one or more earlier transmissions and stored in memory 102.

FEC decoder 112 receives soft-bits from HARQ combining unit 110, via transmission path 134, and attempts to decode the corresponding symbol using forward error correction. The decoded information may be output via transmission path 136. If FEC decoder 112 successfully decodes the information, receiver 100 may generate an acknowledgment (ACK) and send the ACK to the transmitter. The transmitter may then proceed to transmit another data packet. If FEC decoder 112 does not successfully decode the information (i.e., it detects a decoding failure), receiver 100 may generate a negative acknowledgment (NACK) and send the NACK to the transmitter. The transmitter may then proceed to retransmit the data packet.

Memory requesting units 120, 122, 124 and 126 may or may not be present in integrated circuit 104 and are depicted to show that other circuits, aside from HARQ combining unit 110, may have access to memory 102 through memory controller 106. It should be understood that any number of memory requesting units may be present, and that memory controller 106 manages the requests from all circuits. The number of memory requesting units and/or the memory needs of integrated circuit 104 as a whole may be considered, along with the size of memory 102, in determining the number of soft-bits to store from HARQ combining unit 110 in memory 102, as will be described in detail further below.

As discussed above, HARQ combining unit 110 receives soft-bits (e.g., LLRs) from downlink receiver unit 108 and, if soft-bits from a prior transmission of the same data packet are available, combines the stored soft-bits with the newly generated soft-bits and provides the combined soft-bits to FEC decoder 112 for decoding. In addition, HARQ combining unit 110 provides a subset of the received soft-bits (post-combining, if applicable) to memory 102, e.g., through memory controller 106. In some implementations, HARQ combining unit 110 stores the subset of soft-bits in memory 102 regardless of the outcome of the decoding (e.g., prior to or in parallel with providing the soft-bits to FEC decoder 112). In other implementations, HARQ combining unit 110 stores the subset of soft-bits in memory 102 only in response to a decoding failure.

For example, HARQ combining unit 110 may receive $N_1$ soft-bits per symbol from downlink receiver 108 corresponding to a first transmission of a data packet. HARQ combining unit 110 may then store a subset of the $N_1$ soft-bits, or $N_2$ soft-bits per symbol, in memory 102, where $N_2<N_1$. HARQ combining unit 110 may also pass the $N_1$ soft-bits per symbol to FEC decoder 112. If FEC decoder 112 detects a decoding error, the data packet may be retransmitted and HARQ combining unit 110 may receive $N_1$ soft-bits per symbol from downlink receiver 108 corresponding to a second transmission of the data packet. HARQ combining unit 110 may then retrieve the stored $N_2$ soft-bits per symbol from memory 102 and combine the stored $N_2$ soft-bits with the newly received $N_1$ soft-bits (generated from the second transmission) to produce $N_3$ soft-bits per symbol. $N_3$ may be equal to $N_1$ or may exceed $N_1$ depending on the formats (i.e., the allocation of integer bits and fractional bits) of the received and stored soft-bits. HARQ combining unit 110 may then store a subset of the $N_3$ soft-bits, or $N_2$ soft-bits per symbol, in memory 102, while providing the $N_3$ soft-bits per symbol to FEC decoder 112. If a decoding error occurs again, the process may repeat.

The number ($N_2$) of soft-bits to store as part of the subset of the $N_1$ soft-bits may be chosen in any suitable manner. For example, the number ($N_2$) of soft-bits may be chosen based on the amount of memory available (on-chip and/or off-chip), memory bandwidth requirements (e.g., of the combining circuit), receiver performance (e.g., the decoding error rate), or a combination thereof. In addition, or alternatively, the number ($N_2$) of soft-bits may be based on one or more preset, or programmable, values.

The scheme described herein provides a number of advantages. First, the number of soft-bits per symbol generated by the downlink receiver can be increased, thereby enhancing the precision and efficacy of the decoding (e.g., FEC decoding). The performance of the decoder in decoding the initial transmission is critical, and generating a greater number of soft-bits ensures that the receiver performance is optimal. Generating a greater number of bits for retransmissions likewise improves overall performance. Second, storing less than the total number of generated soft-bits in the HARQ memory (or buffer) for retransmission combining reduces memory access requirements. This may result in a smaller memory size and/or lower the memory bandwidth requirement when the soft-bits are retrieved. The savings, in terms of memory size and/or bandwidth, is directly proportional to the number of soft-bits. Moreover, storing a subset of bits permits generating ever-greater numbers of soft-bits per symbol without overburdening the memory. Third, performance can be improved even further by applying different scaling factors to the soft-bits of the various transmissions. For example, the stored soft-bits can be scaled to increase the dynamic range while maintaining desired storage requirements. The scaling factors may be dynamically adjusted during transmission, storage and combining.

Figure 2:
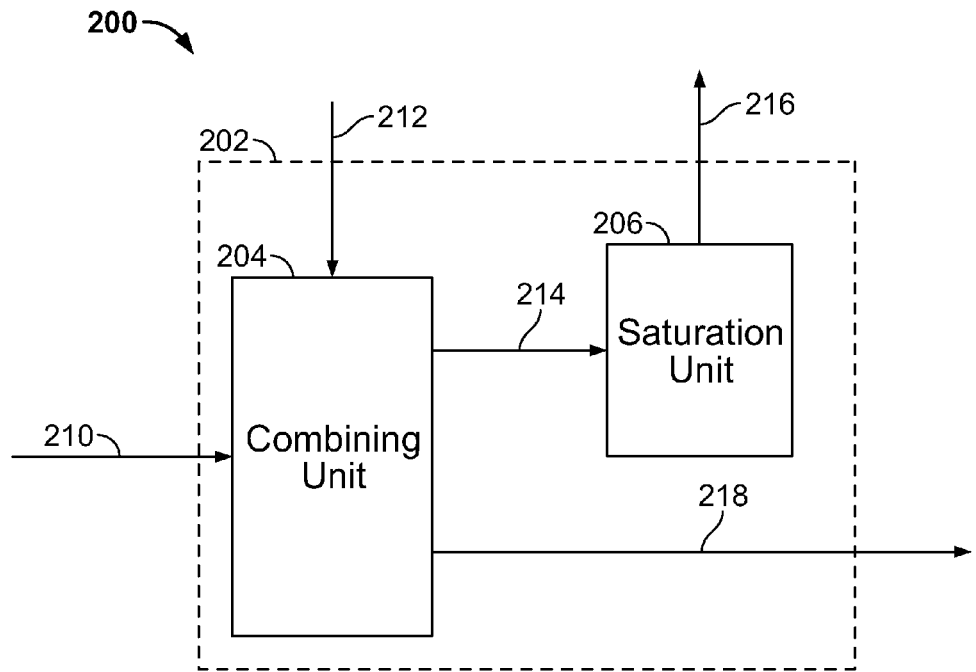
FIG. 2 depicts an exemplary HARQ combining unit of a receiver with saturation functionality in accordance with some implementations.

FIG. 2 depicts an exemplary HARQ combining unit of a receiver with saturation functionality in accordance with some implementations. HARQ combining unit 200 may be substantially similar to HARQ combining unit 110 of FIG. 1. HARQ combining unit 200 includes combining unit 204 and saturation unit 206. Combining unit 204 receives $N_1$ soft-bits corresponding to a current transmission of a data packet, e.g., from downlink receiver 108 of FIG. 1 via transmission path 210, and $N_2$ stored soft-bits corresponding to a prior transmission of the same data packet, e.g., from memory 102 of FIG. 1 via transmission path 212. The $N_2$ stored soft-bits may be fewer in number than the $N_1$ soft-bits of the current transmission, and may have a different format. Combining unit 204 combines the $N_1$ soft-bits of the current transmission with the $N_2$ stored soft-bits to produce $N_3$ combined soft-bits. The $N_3$ combined soft-bits are outputted by combining unit 204 via transmission path 218, e.g., to FEC decoder 112 of FIG. 1. The $N_3$ combined soft-bits are also provided by combining unit 204, via transmission path 214, to saturation unit 206.

Saturation unit 206 receives the $N_3$ combined soft-bits and eliminates some of the soft-bits, saturating the remaining bits if necessary, to produce $N_2$ soft-bits for storage. The $N_2$ soft-bits are output by saturation unit 206 via transmission path 216, e.g., to memory controller 106 of FIG. 1. In some implementations, saturation unit 206 removes the most-significant bits (MSBs) in order to achieve the desired number of bits for storage. For example, saturation unit 206 may receive an 8-bit LLR and remove the two highest order bits in order to produce a 6-bit LLR for storage. If the 8-bit LLR has a value greater than the largest value representable by a 6-bit LLR, saturation unit 206 saturates the 6-bit LLR to the largest value representable.

As an illustrative example, a first LLR may have a value of $(0.4063 \times 2^5)$, or 13, which is represented by 8-bits: "00001101". Combining unit 204 receives these bits for an initial transmission and, there being no stored soft-bits from any previous transmission, provides the bits to saturation unit 216. Saturation unit 216 removes the two highest order bits to produce 6-bit LLR "001101" and stores the 6-bit LLR in memory. Upon the second transmission, combining unit 204 may receive a second LLR having a value of $(0.625 \times 2^5)$, or 20, which is represented by 8-bit LLR "00010100." Combining unit 204 retrieves the stored bits ("001101") and combines them with the newly received bits ("00010100") to generate a combined LLR of "00100001" or 33. These soft-bits are output by combining unit 204 and also provided to saturation unit 206, which removes the two highest order bits and, because 33 exceeds the largest number representable with 6-bit, saturates the LLR to "011111" or 31. The 6-bit LLR is then stored in memory. A third transmission may then result in the production of a third LLR of $(0.7813 \times 2^5)$, or 25, which is represented by 8-bit LLR "00011001." Combining unit 204 retrieves the stored bits ("011111") and combines them with the newly received bits ("00011001") to generate a combined LLR of "00111000" or 56. These soft-bits are output by combining unit 204 and also provided to saturation unit 206, which removes the two highest order bits and, because 56 exceeds the largest number representable with 6 bits, again saturates the LLR to "011111" or 31. The 6-bit LLR is then stored in memory and the process repeats, if necessary.

The above example illustrates an implementation without the use of scalars. Such an implementation requires that the same number of fractional bits of the generated LLR be maintained during storage. For instance, if the LLR received from the downlink receiver has a format of 8.x (8 bits total, of which x are fractional), the stored LLR must retain the format y.x, where the number of total bits y can vary, but the number of fractional bits must remain x. This approach necessitates eliminating the most-significant bits in order to reduce the number of bits for storage. In the above illustrative example, the generated LLR has a format of 8.5 (8 bits total, 5 fractional bits) and the stored LLR has a format of 6.5 (6 bits total, 5 fractional). An alternative implementation of HARQ combining unit 110 if FIG. 1, depicted in FIG. 3, allows for divergent formats by using scalars.

Figure 3:
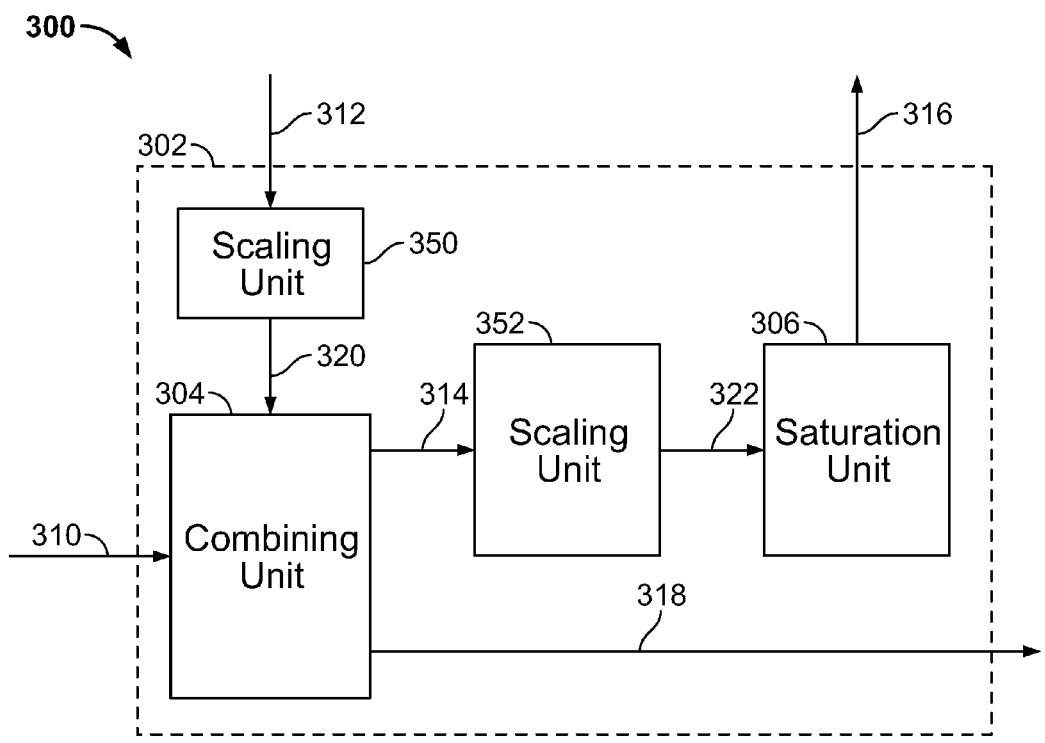
FIG. 3 depicts an exemplary HARQ combining unit of a receiver with scaling and saturation functionality in accordance with some implementations.

FIG. 3 depicts an exemplary HARQ combining unit of a receiver with scaling and saturation functionality in accordance with some implementations. HARQ combining unit 300 may be substantially similar to HARQ combining unit 110 of FIG. 1. HARQ combining unit 300 includes combining unit 304, saturation unit 306, and scaling units 350 and 352. Combining unit 304 receives $N_1$ soft-bits corresponding to a current transmission of a data packet, e.g., from downlink receiver 108 of FIG. 1 via transmission path 310, and $N_4$ scaled soft-bits corresponding to a prior transmission of the same data packet from scaling unit 350 via transmission path 320. The $N_4$ scaled soft-bits may be greater in number than the $N_1$ soft-bits of the current transmission. Combining unit 304 combines the $N_1$ soft-bits of the current transmission with the $N_4$ scaled soft-bits to produce $N_3$ combined soft-bits. The $N_3$ combined soft-bits are output by combining unit 304 via transmission path 318, e.g., to FEC decoder 112 of FIG. 1. The $N_3$ combined soft-bits are also provided by combining unit 304, via transmission path 314, to scaling unit 352.

Scaling units 350 and 352 work in tandem to scale soft-bits in order to increase the dynamic range and accommodate soft information of varying formats. Scaling unit 350 receives $N_2$ stored soft-bits from memory (e.g., memory 102 of FIG. 1) via transmission path 312, scales the $N_2$ stored soft-bits by a first scaling factor, and provides the resulting $N_4$ scaled soft-bits to combining unit 304 via transmission path 320. Scaling unit 352 receives the $N_3$ combined soft-bits from combining unit 304 via transmission path 314, scales the $N_3$ combined soft-bits by a second scaling factor, and provides the scaled soft-bits to saturation unit 306. The first scaling factor may be the inverse of the second scaling factor, such that scaling unit 350 reverses the scaling effect of scaling unit 352.

Saturation unit 306 receives the $N_3$ scaled soft-bits from scaling unit 352 and eliminates some of the soft-bits, saturating the remaining bits if necessary, to produce $N_2$ soft-bits for storage. The $N_2$ soft-bits are output by saturation unit 306 via transmission path 316, e.g., to memory controller 106 of FIG. 1. Although depicted as two separate circuit blocks, it should be understood that scaling unit 352 and saturation unit 306 may be combined into a single unit, such that the same circuit block performs the scaling, saturation, and bit reduction functions. In some implementations, saturation unit 306 removes the most-significant bits (MSBs) in order to achieve the desired number of bits for storage. For example, saturation unit 206 may receive an 8-bit LLR and remove the two highest order bits in order to produce a 6-bit LLR for storage. If the 8-bit LLR has a value greater than the largest value representable by a 6-bit LLR, saturation unit 206 saturates the 6-bit LLR to the largest value representable. In other implementations, saturation unit 306 removes the least-significant bits (LSBs) in order to achieve the desired number of bits for storage. For example, saturation unit 306 may receive an 8-bit LLR and remove the two lowest order bits in order to produce a 6-bit LLR for storage. In yet other implementations, saturation unit 306 removes one or more MSBs and LSBs in order to achieve the desired number of bits for storage. For example, saturation unit 206 may receive an 8-bit LLR and remove the highest order bit and lowest order bit in order to produce a 6-bit LLR for storage. Again, if the 8-bit LLR has a value greater than the largest value representable by a 6-bit LLR, saturation unit 306 saturates the 6-bit LLR to the largest value representable. It should be understood that, when removing LSBs, either truncation or rounding may be employed.

As an illustrative example, a first LLR may have a value of $(0.4063 \times 2^5)$, or 13, which is represented by the 8-bits LLR "00001101". Combining unit 304 receives these bits for an initial transmission and, there being no stored soft-bits from any previous transmission, provides the bits to scaling unit 352. Scaling unit 352 may scale the LLR by $2^{-1}$ and round upwards producing soft-bits "00000111" or 7. Saturation unit 216 may receive these scaled soft-bits, remove the two highest order bits to produce 6-bit LLR "000111" and store the 6-bit LLR in memory. Combining unit 304 may then receive a second LLR for a retransmission having a value of $(0.625 \times 2^5)$, or 20, which is represented by 8-bit LLR "00010100." Scaling unit 350, in the meantime, retrieves the stored bits ("000111") and scales the stored bits by $2^1$, thereby producing an 8-bit LLR of "00001110" (i.e., 14). Combining unit 304 receives the scaled bits ("00001110") and combines them with the newly received bits ("00010100") to generate a combined LLR of "00100010" or 34. These soft-bits are output by combining unit 304 and also provided to scaling unit 352, which rescales the bits by $2^{-1}$ and rounds upwards producing soft-bits "00010001" (i.e., 17). Saturation unit 306 then removes the two highest order bits and, because the LLR of 34 has been scaled to 17, the LLR does not exceed the largest number representable with 6 bits, and so no saturation occurs. The 6-bit LLR "010001" is then stored in memory. A third transmission may then result in the production of a third LLR of (0.7813×$2^5$), or 25, which is represented by 8-bit LLR "00011001." Scaling unit 350 retrieves the stored bits ("010001") and scales the stored bits by $2^1$, thereby producing an 8-bit LLR of "00100010" (i.e., 34). Combining unit 304 receives the scaled bits ("00100010") and combines them with the newly received bits ("00011001") to generate a combined LLR of "00111011" or 59. These soft-bits are output by combining unit 304 and also provided to scaling unit 352, which rescales the bits by $2^{-1}$ and rounds upwards producing soft-bits "00011110" (i.e., 30). These soft-bits are provided to saturation unit 306, which removes the two highest order bits and, because 30 does not exceed the largest number representable with 6 bits, does not need to saturate the LLR. The 6-bit LLR "011110" is then stored in memory and the process repeats, if necessary.

The above example illustrates the use of scaling factors, which provides flexibility in choosing the optimal balance between dynamic range and precision. Specifically, in the example, scaling by $2^{-1}$ effectively eliminates the LSB of the 8-bit LLR. Eliminating the MSB as well results in a 6-bit LLR, which can later be rescaled up to 8-bits to substantially restore the prior value. Although introducing saturation and truncation (or rounding) noise, this technique expands the dynamic range of the stored LLR. It should be understood that any power-of-2 scalar, or any non-power-of-2 scalar, may be used to scale the soft information. Power-of-2 scalars are easily implementable in traditional binary configurations as binary bit shifts. As a result of the flexibility introduced by scaling, the received LLR and stored LLR need not be in identical formats; that is, each may have a different number of fractional bits.

Figure 4:
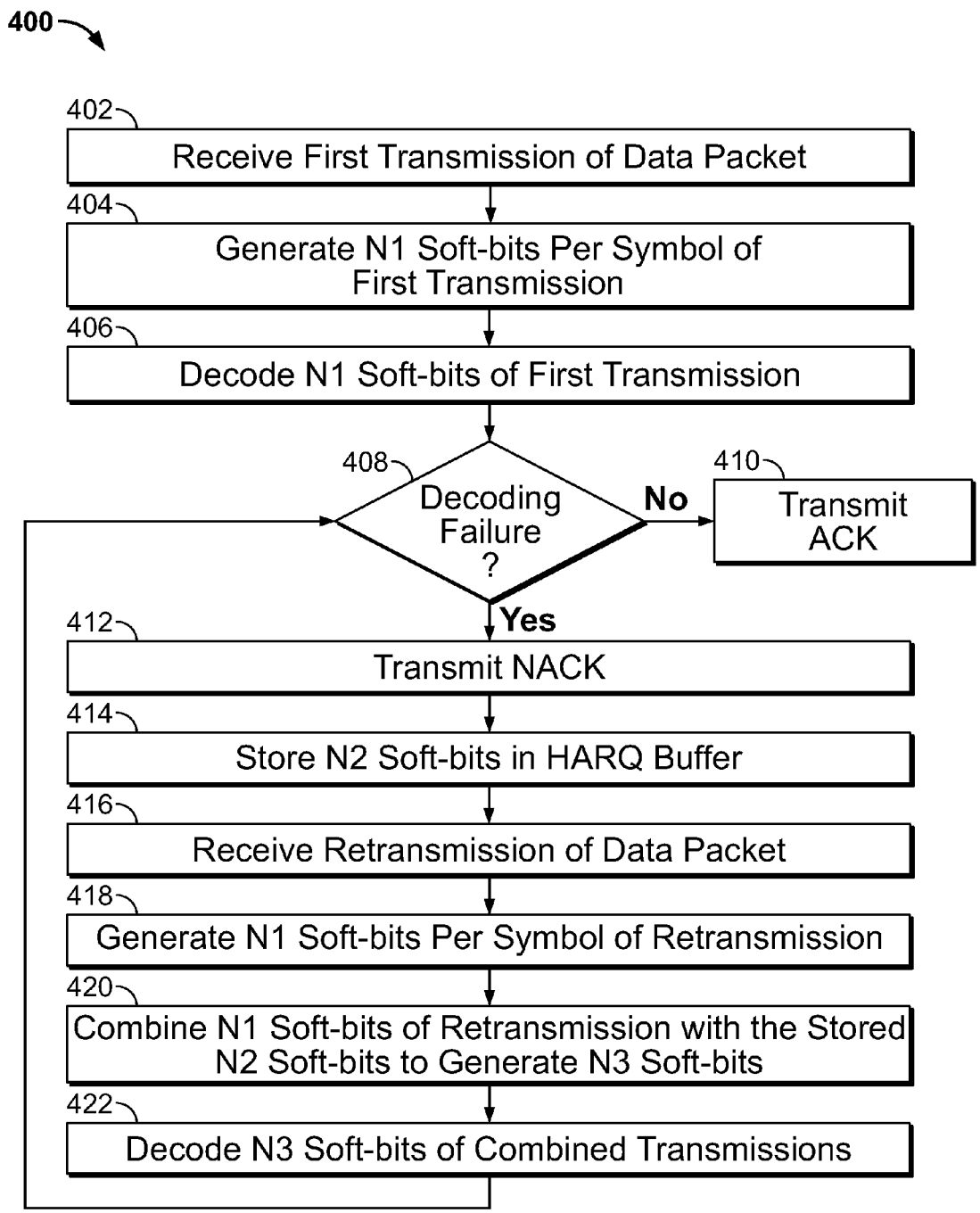
FIG. 4 illustrates an exemplary HARQ combining process using a subset of soft-bits in accordance with some implementations.

FIG. 4 illustrates an exemplary HARQ combining process using a subset of soft-bits in accordance with some implementations. At step 402, a first transmission of a data packet is received (e.g., at downlink receiver 108 of FIG. 1). At step 404, $N_1$ soft-bits per symbol are generated (e.g., by downlink receiver 108 of FIG. 1). The $N_1$ soft-bits may represent an LLR or other soft-information. At step 406, the $N_1$ soft-bits are decoded (e.g., by FEC decoder 112 of FIG. 1) using FEC decoding and/or any other suitable decoding technique and, at step 408, the success or failure of the decoding is determined. If the soft-bits were decoded successfully, a HARQ acknowledgement (ACK) is sent to the transmitter at step 410. Otherwise, a negative acknowledgment (NACK) is sent to the transmitter at step 412. The NACK signals to the transmitter that the data packet should be retransmitted for another decoding attempt.

In addition to sending the NACK, at step 414, a subset of the $N_1$ soft-bits, or $N_2$ soft-bits, are stored in memory (e.g., a HARQ buffer such as memory 102 of FIG. 1). For example, $N_1$ may be equal to 8 and $N_2$ may be equal to 6. Techniques for trimming and/or saturating the number of bits are discussed above and may include eliminating one or more MSBs, LSBs, or both. The use of scaling is discussed more fully in connection with the process of FIG. 5. It should be understood that steps 406-414 may be performed in the order shown, or in any other suitable order. For instance, a subset of the $N_1$ soft-bits may be stored (step 414) prior to, or parallel with, the decoding (step 406) and/or ACK or NACK transmissions (steps 410 and 412).

At step 416, a retransmission of the data packet is received and, at step 418, $N_1$ soft-bits per symbol are generated (e.g., by downlink receiver 108 of FIG. 1). At step 420, the newly generated $N_1$ soft-bits are combined with the stored $N_2$ soft-bits to produce $N_3$ soft-bits. $N_3$ may or may not be equal to $N_1$, depending on the respective formats of the generated and stored soft information. At step 422, the $N_3$ soft-bits are decoded, as in step 406, and the process returns to step 408 for a determination of the success of the decoding. The process may loop in case of decoding failure, as shown, any suitable number of times or until the decoding executes successfully.

Figure 5:
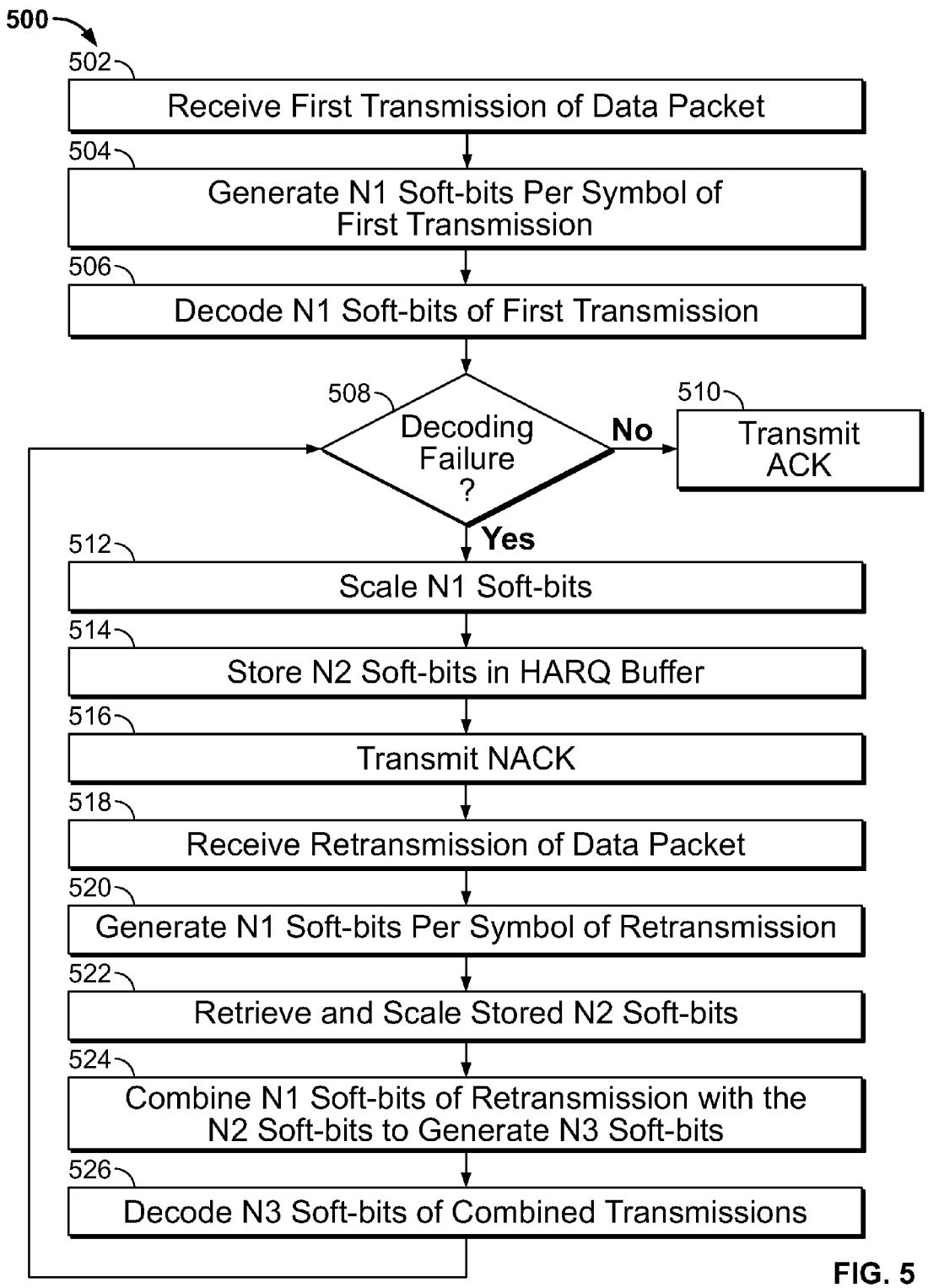
FIG. 5 illustrates an exemplary HARQ combining process using a subset of soft-bits and a scaling technique in accordance with some implementations.

FIG. 5 illustrates an exemplary HARQ combining process using a subset of soft-bits and a scaling technique in accordance with some implementations. At step 502, a first transmission of a data packet is received (e.g., at downlink receiver 108 of FIG. 1). At step 504, $N_1$ soft-bits per symbol are generated (e.g., by downlink receiver 108 of FIG. 1). The $N_1$ soft-bits may represent an LLR or other soft-information. At step 506, the $N_1$ soft-bits are decoded (e.g., by FEC decoder 112 of FIG. 1) using FEC decoding and/or any other suitable decoding technique and, at step 508, the success or failure of the decoding is determined. If the soft-bits were decoded successfully, a HARQ acknowledgement (ACK) is sent to the transmitter at step 410. Otherwise, at step 512, the $N_1$ soft-bits are scaled by a scaling factor and, at step 514, a subset of the $N_1$ soft-bits, or $N_2$ soft-bits, are stored in memory (e.g., a HARQ buffer such as memory 102 of FIG. 1). The scaling factor may be used to eliminate one or more LSBs of the soft information, as described above. Moreover, the scaling factor may be any suitable number, including any power-of-2 or non-power-of-2. In addition to scaling, the bit size of the soft information may be reduced by trimming one or more MSBs. Techniques for trimming and/or saturating the number of bits are discussed above and may include eliminating one or more MSBs, LSBs, or both. At step 516, a negative acknowledgment (NACK) is sent to the transmitter at step 412. The NACK signals to the transmitter that the data packet should be retransmitted for another decoding attempt.

It should be understood that steps 506-516 may be performed in the order shown, or in any other suitable order. For instance, a subset of the $N_1$ soft-bits may be scaled and stored (steps 512 and 514) prior to, or parallel with, the decoding (step 506) and/or ACK or NACK transmissions (steps 510 and 516).

At step 518, a retransmission of the data packet is received and, at step 520, $N_1$ soft-bits per symbol are generated (e.g., by downlink receiver 108 of FIG. 1). Subsequently, or in parallel, the stored $N_2$ soft-bits are retrieved and scaled at step 522. In particular, the stored $N_2$ soft-bits are scaled by a scaling factor to restore the value of the soft information prior to the scaling of step 512. For example, the scaling factor of step 522 may the inverse of the scaling factor of step 512. The scaling may result in an increase in the number of bits, e.g., restoring the soft information to $N_1$ soft-bits per symbol.

At step 524, the newly generated $N_1$ soft-bits are combined with the scaled $N_2$ soft-bits to produce $N_3$ soft-bits. $N_3$ may or may not be equal to $N_1$, depending on the respective formats of the generated and stored soft information. At step 526, the $N_3$ soft-bits are decoded, as in step 506, and the process returns to step 508 for a determination of the success of the decoding. The process may loop in case of decoding failure, as shown, any suitable number of times or until the decoding executes successfully. In addition, the scaling factors applied in steps 512 and 522 may dynamically change from transmission to transmission in order to optimize receiver performance. For example, greater precision may be desirable for the first transmission(s), while a larger dynamic range is desirable for subsequent transmissions. The receiver may automatically select scaling factors based on the results of the decoding in step 506 and 526, or the receiver may be programmed to select a preset scaling factor for each transmission.

The above described implementations are presented for the purposes of illustration and not of limitation. Other embodiments are possible and one or more parts of techniques described above may be performed in a different order (or concurrently) and still achieve desirable results. In addition, techniques of the disclosure may be implemented in hardware, such as on an application-specific integrated circuit (ASIC) or on a field-programmable gate array (FPGA). The techniques of the disclosure may also be implemented in software.

What is claimed is:

1. A method for decoding a data packet, the method comprising:
    receiving a first transmission of the data packet;
    generating first soft information for the first transmission of the data packet, wherein the first soft information is represented by a first set of bits;
    storing a subset of the first set of bits;
    receiving a second transmission of the data packet;
    generating second soft information for the second transmission of the data packet, wherein the second soft information is represented by a second set of bits;
    combining the second set of bits with the stored subset of bits to produce a third set of bits;
    decoding a portion of the data packet based on the third set of bits;
    scaling the first set of bits by a scale factor prior to the storing; and
    scaling the stored subset of bits by an inverse of the scale factor prior to the combining.

2. The method of claim 1, wherein the first soft information is a first log-likelihood ratio for a bit in the data packet, and wherein the second soft information is a second log-likelihood ratio for the bit.

3. The method of claim 1 further comprising:
    performing a decoding operation on the first set of bits;
    identifying a decoding failure during the decoding operation; and
    transmitting a negative acknowledgment (NACK), wherein the second transmission of the data packet is transmitted in response to the NACK.

4. The method of claim 3 further comprising:
    storing the subset of the first set of bits in response to identifying the decoding failure.

5. The method of claim 1 further comprising:
    identifying an amount of available memory; and
    determining a size of the subset of the first set of bits based on the amount of available memory or receiver performance.

6. The method of claim 5, wherein each of the first set of bits and the second set of bits contains 8 bits, and wherein the stored subset of bits contains 6 bits.

7. The method of claim 1, wherein the combining comprises:
    determining a format of the second set of bits;
    determining a format of the stored subset of bits; and
    aligning the second set of bits with the stored subset of bits based on (i) the determined formats of the second set of bits and (ii) the determined format of the stored subset of bits.

8. The method of claim 1, wherein the stored subset of bits is a first stored subset of bits, and the scale factor is a first scale factor, and wherein the method further comprises:
    identifying a decoding failure during the decoding;
    scaling the third set of bits by a second scale factor different from the first scale factor;
    storing a subset of the scaled third set of bits as a second stored subset of bits;
    receiving a third transmission of the data packet;
    generating third soft information for the third transmission of the data packet, wherein the third soft information is represented by a fourth set of bits;
    scaling the second stored subset of bits by an inverse of the second scale factor;
    combining the fourth set of bits with the scaled second stored subset of bits to produce a fifth set of bits; and
    decoding a portion of the data packet based on the fifth set of bits.

9. The method of claim 1, wherein the storing comprises saturating the first set of bits to produce the subset of the first set of bits based on a desired size of the subset, and wherein the saturating comprises at least one of:
    eliminating one or more high-order bits in the first set of bits; and
    eliminating one or more low-order bits in the first set of bits.

10. A system for decoding a data packet, the system comprising:
    a downlink receiver configured to:
        receive a first transmission of the data packet; and
        generate first soft information for the first transmission of the data packet, wherein the first soft information is represented by a first set of bits;
    a memory configured to store a subset of the first set of bits;
    the downlink receiver further configured to:
        receive a second transmission of the data packet; and
        generate second soft information for the second transmission of the data packet, wherein the second soft information is represented by a second set of bits;
    a combining circuit configured to combine the second set of bits with the stored subset of bits to produce a third set of bits;
    a decoder configured to decode a portion of the data packet based on the third set of bits;
    a first scaling circuit configured to scale the first set of bits by a scale factor prior to the storing; and
    a second scaling circuit configured to scale the stored subset of bits by an inverse of the scale factor prior to the combining.

11. The system of claim 1 further comprising:
    a saturation unit configured to saturate the first set of bits to produce the subset of the first set of bits based on a desired size of the subset, and wherein the saturating comprises at least one of:
        eliminating one or more high-order bits in the first set of bits; and
        eliminating one or more low-order bits in the first set of bits.

12. The system of claim 10, wherein the stored subset of bits is a first stored subset of bits and the scale factor is a first scale factor, and wherein:
    the decoder is further configured to identify a decoding failure during the decoding;

the first scaling circuit is further configured to scale the third set of bits by a second scale factor different from the first scale factor;

the memory is further configured to store a subset of the scaled third set of bits as a second stored subset of bits;

the downlink receiver is further configured to:
   receive a third transmission of the data packet; and
   generate third soft information for the third transmission of the data packet, wherein the third soft information is represented by a fourth set of bits;

the second scaling circuit is further configured to scale the second stored subset of bits by an inverse of the second scale factor;

the combining circuit is further configured to combine the fourth set of bits with the scaled second stored subset of bits to produce a fifth set of bits; and the decoder is further configured to decode a portion of the data packet based on the fifth set of bits.

13. The system of claim 10, wherein the first soft information is a first log-likelihood ratio for a bit in the data packet, and wherein the second soft information is a second log-likelihood ratio for the bit.

14. The system of claim 10, wherein the decoder is further configured to:
   perform a decoding operation on the first set of bits;
   identify a decoding failure during the decoding operation; and
   initiate a transmission of a negative acknowledgment (NACK), wherein the second transmission of the data packet is transmitted in response to the NACK.

15. The system of claim 14, wherein the memory is further configured to store the subset of the first set of bits in response to the decoding failure.

16. The system of claim 10, further comprising processing circuitry configured to:
   identify an amount of available memory; and
   determine a size of the subset of the first set of bits based on the amount of available memory or receiver performance.

17. The system of claim 16, wherein each of the first set of bits and the second set of bits contains 8 bits, and wherein the stored subset of bits contains 6 bits.

18. The system of claim 10, wherein the combining circuit is further configured to:
   determine a format of the second set of bits;
   determine a format of the stored subset of bits; and
   align the second set of bits with the stored subset of bits based on (i) the determined formats of the second set of bits and (ii) the determined format of the stored subset of bits.

19. A method for decoding a data packet, the method comprising:
   receiving a first transmission of the data packet;
   generating first soft information for the first transmission of the data packet, wherein the first soft information is represented by a first set of bits;
   storing a subset of the first set of bits;
   receiving a second transmission of the data packet;
   generating second soft information for the second transmission of the data packet, wherein the second soft information is represented by a second set of bits;
   combining the second set of bits with the stored subset of bits to produce a third set of bits; and
   decoding a portion of the data packet based on the third set of bits;
   wherein the storing comprises saturating the first set of bits to produce the subset of the first set of bits based on a desired size of the subset, and wherein the saturating comprises at least one of:
      eliminating one or more high-order bits in the first set of bits; and
      eliminating one or more low-order bits in the first set of bits.

* * * * *